US009487866B2

(12) United States Patent
Kramer et al.

(10) Patent No.: US 9,487,866 B2
(45) Date of Patent: *Nov. 8, 2016

(54) TRIVALENT CHROMIUM-CONTAINING COMPOSITION FOR USE IN CORROSION RESISTANT COATINGS ON METAL SURFACES

(75) Inventors: Kirk Kramer, West Bloomfield, MI (US); Lisa K. Salet, Sterling Heights, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 889 days.

This patent is subject to a terminal disclaimer.

(21) Appl. No.: 11/746,802

(22) Filed: May 10, 2007

(65) Prior Publication Data
US 2010/0132843 A1 Jun. 3, 2010

Related U.S. Application Data

(60) Provisional application No. 60/799,291, filed on May 10, 2006.

(51) Int. Cl.
C23C 22/30 (2006.01)
C23C 22/34 (2006.01)
C23C 22/83 (2006.01)
C23C 22/56 (2006.01)

(52) U.S. Cl.
CPC ............. *C23C 22/34* (2013.01); *C23C 22/83* (2013.01); *C23C 2222/10* (2013.01)

(58) Field of Classification Search
CPC .... C23C 22/30; C23C 22/34; C23C 2222/10
USPC ................................................ 148/247, 267
See application file for complete search history.

(56) References Cited

U.S. PATENT DOCUMENTS

| 3,932,198 | A | * | 1/1976 | Schneider ................ 148/265 |
| 4,084,014 | A | | 4/1978 | Fabregas |
| 4,169,741 | A | | 10/1979 | Lampatzer et al. |
| 4,171,231 | A | | 10/1979 | Bishop et al. |
| 4,183,772 | A | | 1/1980 | Davis |
| 4,266,988 | A | | 5/1981 | Krippes |
| 4,540,733 | A | | 9/1985 | Ito et al. |
| 4,644,029 | A | | 2/1987 | Cable et al. |
| 4,647,316 | A | | 3/1987 | Prescott |
| 4,705,821 | A | | 11/1987 | Ito et al. |
| 4,761,189 | A | | 8/1988 | Mady et al. |
| 4,801,337 | A | | 1/1989 | Higgins |
| 4,956,027 | A | | 9/1990 | Saeki et al. |
| 4,963,198 | A | | 10/1990 | Higgins |
| 4,966,634 | A | | 10/1990 | Saeki et al. |
| 4,992,116 | A | | 2/1991 | Hallman |
| 5,000,799 | A | | 3/1991 | Miyawaki |
| 5,039,360 | A | | 8/1991 | Brugarolas et al. |
| 5,045,130 | A | | 9/1991 | Gosset et al. |
| 5,073,196 | A | | 12/1991 | Fotinos et al. |
| 5,082,511 | A | | 1/1992 | Farina et al. |
| 5,089,064 | A | | 2/1992 | Reghi |
| 5,091,023 | A | | 2/1992 | Saeki et al. |
| 5,125,989 | A | | 6/1992 | Hallman |
| 5,141,575 | A | | 8/1992 | Yoshitake et al. |
| 5,143,562 | A | | 9/1992 | Boulos |
| 5,242,714 | A | | 9/1993 | Steele et al. |
| 5,261,973 | A | | 11/1993 | Sienkowski et al. |
| 5,268,042 | A | | 12/1993 | Carlson |
| 5,281,282 | A | | 1/1994 | Dolan et al. |
| 5,298,092 | A | | 3/1994 | Schriever |
| 5,304,257 | A | | 4/1994 | Pearlstein et al. |
| 5,308,709 | A | | 5/1994 | Ogino et al. |
| 5,318,640 | A | | 6/1994 | Ishii et al. |
| 5,321,061 | A | | 6/1994 | Anderson et al. |
| 5,342,456 | A | | 8/1994 | Dolan |
| 5,356,490 | A | | 10/1994 | Dolan et al. |
| 5,366,567 | A | | 11/1994 | Ogino et al. |
| 5,374,347 | A | | 12/1994 | Pearlstein et al. |
| 5,378,291 | A | | 1/1995 | Ara et al. |
| 5,378,292 | A | | 1/1995 | Miller et al. |
| 5,378,392 | A | | 1/1995 | Murashro et al. |
| 5,391,239 | A | | 2/1995 | Boulos |
| 5,393,354 | A | | 2/1995 | Bishop |
| 5,395,655 | A | | 3/1995 | Kazuyuki et al. |
| 5,399,209 | A | | 3/1995 | Suda et al. |
| 5,407,749 | A | | 4/1995 | Bishop |
| 5,411,606 | A | | 5/1995 | Schriever |
| 5,415,687 | A | | 5/1995 | Schriever |
| 5,415,702 | A | | 5/1995 | Bishop et al. |
| 5,427,623 | A | | 6/1995 | Schumann et al. |
| 5,427,632 | A | | 6/1995 | Dolan |
| 5,449,414 | A | | 9/1995 | Dolan |
| 5,449,415 | A | | 9/1995 | Dolan |
| 5,451,271 | A | | 9/1995 | Yoshida et al. |
| 5,452,884 | A | | 9/1995 | Gugsch et al. |
| 5,454,882 | A | | 10/1995 | Asai et al. |

(Continued)

FOREIGN PATENT DOCUMENTS

| EP | 1378585 A1 | 1/2004 |
| EP | 1447460 A1 | 8/2004 |

(Continued)

OTHER PUBLICATIONS

International Search Report dated Sep. 20, 2007, International Application PCT/US2007/068640.

(Continued)

*Primary Examiner* — Lois Zheng

(74) *Attorney, Agent, or Firm* — Mary K. Cameron

(57) ABSTRACT

A low sludge trivalent chromium based conversion coating bath is provided which forms corrosion resistant coatings on aluminum and aluminum alloys by immersion in aqueous solutions containing trivalent chromium ions and fluorometallate ions followed by optional rinsing. Trivalent chromium coated aluminum also serves as an effective base for paint primers.

24 Claims, No Drawings

(56) References Cited

U.S. PATENT DOCUMENTS

| | | |
|---|---|---|
| 5,472,522 A | 12/1995 | Kawaguchi et al. |
| 5,472,524 A | 12/1995 | Schriever |
| 5,487,949 A | 1/1996 | Schriever |
| 5,498,300 A | 3/1996 | Aoki et al. |
| 5,498,759 A | 3/1996 | Nakada et al. |
| 5,507,084 A | 4/1996 | Richter |
| 5,507,884 A | 4/1996 | Ogino et al. |
| 5,534,082 A | 7/1996 | Dollman et al. |
| 5,551,994 A | 9/1996 | Schriever |
| 5,595,611 A | 1/1997 | Boulos et al. |
| 5,645,650 A | 7/1997 | Ishizaki et al. |
| 5,683,816 A | 11/1997 | Goodreau |
| 5,700,334 A | 12/1997 | Ishii et al. |
| 5,700,561 A | 12/1997 | Mano et al. |
| 5,702,759 A | 12/1997 | White et al. |
| 5,769,667 A | 6/1998 | Belopolsky |
| 5,769,967 A | 6/1998 | Dolan |
| 5,807,442 A | 9/1998 | Goodreau |
| 5,851,371 A | 12/1998 | Steinbrecher et al. |
| 5,859,095 A | 1/1999 | Moyle et al. |
| 5,958,511 A | 9/1999 | Dolan |
| 6,010,263 A | 1/2000 | White et al. |
| 6,096,140 A | 8/2000 | Susa et al. |
| 6,099,714 A | 8/2000 | Bibber |
| 6,149,735 A | 11/2000 | Oue et al. |
| 6,248,181 B1 | 6/2001 | Osako et al. |
| 6,294,262 B1 | 9/2001 | Fukuoka |
| 6,361,622 B1 | 3/2002 | McCormick et al. |
| 6,375,726 B1 | 4/2002 | Matzdorf et al. |
| 6,511,532 B2 * | 1/2003 | Matzdorf et al. ......... 106/14.44 |
| 6,521,029 B1 | 2/2003 | Matzdorf et al. |
| 6,527,841 B2 | 3/2003 | Matzdorf et al. |
| 6,596,062 B2 | 7/2003 | Chung et al. |
| RE38,285 E | 10/2003 | Susa et al. |
| 6,648,986 B1 | 11/2003 | Tang et al. |
| 6,663,700 B1 | 12/2003 | Matzdorf et al. |
| 6,669,764 B1 | 12/2003 | Matzdorf et al. |
| 6,706,123 B2 | 3/2004 | Fristad et al. |
| 6,723,178 B1 | 4/2004 | Bannai et al. |
| 6,887,321 B2 | 5/2005 | Parkos, Jr. et al. |
| 7,018,486 B2 | 3/2006 | Bhatia |
| 7,328,873 B2 | 2/2008 | Suzuki et al. |
| RE40,406 E | 7/2008 | McCormick et al. |
| 8,092,617 B2 | 1/2012 | Kramer et al. |
| 8,241,744 B2 | 8/2012 | Kikuchi et al. |
| 2002/0053301 A1 | 5/2002 | Matzdorf et al. |
| 2002/0117236 A1 | 8/2002 | Matzdorf et al. |
| 2003/0027011 A1 | 2/2003 | Kotov et al. |
| 2003/0145909 A1 | 8/2003 | Diaddario, Jr. et al. |
| 2003/0217787 A1 | 11/2003 | Parkos, Jr. et al. |
| 2003/0230215 A1 | 12/2003 | Matzdorf et al. |
| 2004/0000358 A1 | 1/2004 | Bhatia |
| 2004/0217328 A1 | 11/2004 | Matsui et al. |
| 2005/0109426 A1 | 5/2005 | Inoue et al. |
| 2005/0178475 A9 | 8/2005 | Bhatia |
| 2005/0194574 A1 | 9/2005 | Yamamuro et al. |
| 2006/0116537 A1 | 6/2006 | Cuzzato |
| 2006/0180247 A1 | 8/2006 | Matzdorf et al. |
| 2006/0191599 A1 | 8/2006 | Matzdorf et al. |
| 2006/0237098 A1 | 10/2006 | Matzdorf et al. |
| 2006/0240191 A1 | 10/2006 | Matzdorf et al. |
| 2007/0089808 A1 | 4/2007 | Hashimoto |
| 2007/0187001 A1 * | 8/2007 | Kramer et al. ............ 148/247 |
| 2009/0045379 A1 | 2/2009 | Pellet et al. |
| 2010/0132843 A1 | 6/2010 | Kramer |
| 2010/0170594 A1 | 7/2010 | Inbe et al. |
| 2012/0177946 A1 | 7/2012 | Brouwer et al. |
| 2014/0084221 A1 | 3/2014 | Matzdorf et al. |

FOREIGN PATENT DOCUMENTS

| | | | |
|---|---|---|---|
| EP | 1992718 A1 | 11/2008 | |
| JP | 61-000587 A | 1/1986 | |
| JP | 07-126859 A | 5/1995 | |
| JP | 11-335865 A | 12/1999 | |
| JP | 11343450 A | 12/1999 | |
| JP | 41922001-17 A | 6/2001 | |
| JP | 2001174192 A | 6/2001 | |
| JP | 2004-210872 A | 7/2004 | |
| JP | 2004210873 A | 7/2004 | |
| JP | 3784400 * | 6/2006 | ............ C23C 22/34 |
| JP | 2006-328501 * | 12/2006 | ............ C23C 22/34 |
| JP | 2006328501 A | 12/2006 | |
| SU | 1450400 A1 | 12/1983 | |
| WO | WO 99/08806 A1 | 2/1999 | |
| WO | WO 02/055758 A2 | 7/2002 | |
| WO | WO 03/040431 A2 | 5/2003 | |
| WO | WO 03/040437 A1 | 5/2003 | |
| WO | 2004065642 A2 | 8/2004 | |
| WO | WO 2005/056876 A1 | 6/2005 | |
| WO | WO 2006/088519 A2 | 8/2006 | |
| WO | WO 2006/128154 A1 | 11/2006 | |
| WO | 2007095517 A1 | 8/2007 | |
| WO | 2007134152 A1 | 11/2007 | |

OTHER PUBLICATIONS

Written Opinion dated Sep. 20, 2007, International Application PCT/US2007/068640.

International Search Report dated Jul. 6, 2007, International Application PCT/US2007/062026.

Written Opinion dated Jul. 6, 2007, International Application PCT/US2007/062026.

JP Notification of Reasons for Rejection Dated Mar. 19, 2013, Application No. 2009-510172 (with English Translation and 2nd Office Action Comments). 10 Pages.

Japanese Notice of Reasons for Rejection Dated May 29, 2014, Application No. 2009-510172, 8 Pages.

Chinese Notification of the First Office Action Dated Apr. 13, 2010, Applicant Henkel AG & Co. KGAA, 6 Pages.

Extended European Search Report Dated Jul. 22, 2011, Applicant Henkel AG & Co, KGaA.

JP Notification of Reasons for Rejection, Dated May 29, 2012, Application No. 2009-510172, 3 Pages.

PCT International Search Report Dated Oct. 22, 2014, Application No. PCT/IB2014/001018, 4 Pages.

PCT Written Opinion of the International Search Authority Dated Oct. 22, 2014, Application No. PCT/IB2014/001018, 7 Pages.

* cited by examiner

TRIVALENT CHROMIUM-CONTAINING COMPOSITION FOR USE IN CORROSION RESISTANT COATINGS ON METAL SURFACES

CROSS-REFERENCE

This application claims priority of U. S. Provisional Application Ser. No. 60/799,291, filed May 10, 2006.

FIELD OF THE INVENTION

This invention relates to a method of treating metal surfaces to enhance corrosion resistance and paint bonding characteristics and relates to trivalent chromium-containing coatings for aluminum and aluminum alloys used in such processes. More particularly, this invention relates to an aqueous composition, suitable for use as a rinseable or dry-in place conversion coating for metal, that comprises trivalent chromium cations, fluorometallate anions, their corresponding counter-ions, and other optional components, and methods for using same.

BACKGROUND OF THE INVENTION

It is generally known to treat the surfaces of metals, such as zinc, cadmium, or aluminum with aqueous solutions that include hexavalent chromium, which contain chemicals that dissolve the surface of the metal and form insoluble films known as "chromate conversion coatings." These hexavalent chromium-containing coatings are corrosion resistant and protect the metal from various elements which cause corrosion. In addition, it is known that chromate conversion coatings generally have good paint bonding characteristics and, therefore, provide an excellent base for paint or other finishes.

Although the aforementioned coatings enhance corrosion resistance and paint bonding properties, the coatings have a serious drawback, i.e., the toxic nature of the hexavalent chromium constituent. This is a serious problem from two viewpoints, one being the handling of the solution by operators and the other, the disposal of the used solution. Therefore, it is highly desirable to have coating solutions and coatings that are substantially free of hexavalent chromium, but at the same time capable of imparting corrosion resistance and paint bonding properties which are comparable to those imparted by conventional hexavalent chromium-containing coatings.

Of particular interest is the use of chromate conversion coatings on aircraft aluminum alloys due to excellent corrosion resistance and the ability to serve as an effective base for paint. Conventional baths used to develop these coatings contain hexavalent chromium, and it is the residual chromates in the coating that are largely responsible for the high degree of corrosion inhibition. However, these same chromates are highly toxic and their presence in waste water effluents is severely restricted. It would therefore, be desirable to provide a coating for aluminum and its alloys and for sealing of anodized aluminum utilizing relatively less toxic chemicals that could serve as an alternative to the toxic hexavalent chromate coatings. Trivalent chromium has been used in conversion coatings in addition to and instead of hexavalent chromium in an attempt to produce replacements for hexavalent chromium-containing coatings, but to date, these attempts have been only somewhat successful.

Current trivalent chromium corrosion preventive coatings are applied using chromium sulfate and potassium fluorozirconate in a working solution at a ratio of chromium:zirconium of about 0.4:1 to about 0.6:1. One drawback of this prior art solution is that the working bath is not as stable as desired. The chromium sulfate and potassium fluorozirconate-based composition is not storage stable in that, upon aging for about 1-2 weeks, a precipitate begins to form, even in unused compositions. In use, the working bath generates a significant amount of sludge that must be removed, which results in costly down-time for the processing line and disposal issues. The onset of precipitation in the bath also has a negative impact on the conversion coating formed. The conversion coatings from aged baths of the prior art have reduced corrosion resistance. Thus there is a need for an improved trivalent chromium corrosion preventive coating that overcomes these and other drawbacks of the prior art.

SUMMARY OF THE INVENTION

It is therefore an object of this invention to provide a novel chromium-containing solution for treating aluminum, which contains no hexavalent chromium.

It is another object of this invention to provide a composition for treating aluminum which contains chromium only in its trivalent oxidation state.

It is still another object of this invention to provide a trivalent chromium-containing solution wherein said chromium has little or no tendency to precipitate from the solution.

It is an object of the invention to provide compositions for treating a metal surface comprising a component of fluorometallate anions; a component of chromium(III) cations; and, optionally, one or more of the following components: a component of free fluoride ions; a component of surfactant molecules; a pH adjusting component and a viscosity increasing component.

It is likewise an object of the invention to provide a coating, that is formed by contacting the metal surface with a composition of the invention and then rinsing, which comprises chromium in substantially only trivalent form and which provides salt spray resistance of at least 96, 120, 144, 168, 192, 216, 240, 264, 288, 312, 336, 360, 408, 456, 480, 504 hours according to ASTM B-117.

This invention is particularly well suited to forming a coating on metal surfaces consisting predominantly of iron, titanium, aluminum, magnesium and/or zinc and alloys thereof; this includes Galvalume™ and Galvaneal™. One of skill in the art will understand "predominantly" as used herein to mean the predominant element is the one comprising the greatest amount by weight of the alloy. Other objects will be apparent to those skilled in the art from the description below.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, throughout this description, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ by chemical reactions specified in the description, and does not necessarily preclude other chemical interactions among the constituents of a mixture once mixed; specification of materials in ionic form additionally implies the presence of sufficient counter ions to produce electrical neutrality for the composition as a whole (any counter ions thus implicitly specified should preferably be selected from among other constituents explicitly specified in ionic form, to the extent possible; otherwise such counter ions may be freely selected, except for avoiding counter ions that act adversely to the objects of the invention); the term "paint" includes all like materials that may be designated by more specialized terms such as primer, lacquer, enamel, varnish, shellac, topcoat, and the like; and the term "mole" and its variations may be applied to elemental, ionic, and any other chemical species defined by number and type of atoms present, as well as to compounds with well defined molecules.

DETAILED DESCRIPTION OF A PREFERRED EMBODIMENT

One embodiment of the present invention provides a liquid composition that comprises, preferably consists essentially of or more preferably consists of, water and:
- (A) a component of fluorometallate anions, each of said anions consisting of:
  - (i) at least four fluorine atoms; and
  - (ii) at least one atom of an element selected from the group consisting of titanium, zirconium, hafnium, silicon, aluminum, and boron; and, optionally, one or both of
  - (iii) at least one ionizable hydrogen atom; and
  - (iv) at least one oxygen atom;
- (B) a component of chromium(III) cations;
- wherein the ratio of chromium:zirconium ranges from 10:1 to 25:1 and, optionally, one or more of the following components:
- (C) a component of free fluoride ions that are not part of any of immediately previously recited components (A) through (B);
- (D) a component of surfactant molecules that are not part of any of immediately previously recited components (A) through (C);
- (E) a pH adjusting component that is not part of any of the immediately previously recited components (A) through (D); and
- (F) a viscosity increasing component that is not part of any of the immediately previously recited components (A) through (E).

It should be understood that the components listed need not necessarily all be provided by separate chemicals.

It has been found that excellent coating quality, particularly for corrosion resistance on previously untreated areas, can be achieved by:
- (I) contacting the metal substrate surface with the above described composition of the invention to form a wet coated metal substrate surface;
- (II) optionally, rinsing the wet coated metal substrate surface; and
- (III) drying the wet coated metal substrate surface.

The compositions of the invention have been developed as hexavalent chromium-free. Although not preferred, formulations according to the invention can be made including hexavalent chromium. Compositions according to the invention desirably contain less than 0.04, 0.02, 0.01, 0.001, 0.0001, 0.00001, 0.000001 percent by weight of hexavalent chromium, most preferably essentially no hexavalent chromium. The amount of hexavalent chromium present in the compositions of the invention is desirably minimized and preferably only trace amounts are present, most preferably no hexavalent chromium is present.

It is known in the prior art to oxidize some of the trivalent chromium in a coating to form hexavalent chromium, see U.S. Pat. No. 5,304,257. In the present invention, it is desirable that the coatings formed by compositions according to the invention contain little or no hexavalent chromium, though not preferred the compositions may contain hexavalent chromium in the amounts as recited in the immediately preceding paragraph. It will be understood by those of skill in the art that the invention includes coatings that contain no hexavalent chromium but which may, due to subsequent exposure to weathering or other treatments, contain hexavalent chromium resulting from oxidation of the trivalent chromium in the coating.

In a preferred embodiment of the invention, the composition and the resulting coating are substantially free, desirably essentially free, of hexavalent chromium. More preferably, any hexavalent chromium is present in trace amounts or less, and most preferably the compositions contain no hexavalent chromium.

Various embodiments of the invention include processes for treating surfaces as described above, optionally in combination with other process steps that may be conventional per se, such as precleaning, rinsing, and subsequent further protective coatings over those formed according to the invention; compositions useful for treating surfaces as described above; and articles of manufacture including surfaces treated according to a process of the invention.

Independently of the concentration of Component (A), the fluorometallate anions preferably are fluorosilicate (i.e., $SiF_6^{-2}$), fluorotitanate (i.e., $TiF_6^{-2}$) or fluorozirconate (i.e., $ZrF_6^{-2}$), more preferably fluorotitanate or fluorozirconate, most preferably fluorozirconate.

A working composition for use in a process according to this invention preferably has a concentration of component (A) of at least, with increasing preference in the order given, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.8, 10.0 grams of fluorometallate anions, component (A), per kilogram of total working composition. The upper limit of component (A) is generally based upon solubility and/or the ratio of B:A, and preferably is not more than with increasing preference 100, 90, 80, 70, 60 g/kg.

Desirably, the cation for the fluorometallate anion is selected from ions of Group IA elements, or ammonium ions. Preferably the cation is K or H, most preferably H.

Component (B) as defined above is to be understood as including one or more of the following sources of trivalent chromium cations: nitrates, sulfates, and fluorides of chromium(III). In a preferred embodiment, Component (B) comprises, preferably consists essentially of, most preferably consists of trivalent chromium fluoride. The total concentration of the trivalent chromium cation source in a working composition according to the invention is preferably at least, with increasing preference in the order given, 4, 5, 6, 7, 8, 9, 10, 11, 12, 13, 14, 15, 15.5, 16, 16.5, 17, 17.5, 18, 18.5, 19, 19.5, 20, 21, 22, 23, 24, 25, 26, 27, 28, 29, 30, 31, 32, 33, 34, 35 g/l, and independently, primarily for reasons of economy and solubility, is preferably not more than, with increasing preference in the order given, 100, 90, 80, 70, 60, 55, 50, 45, 44, 43, 42, 41, 40, 39, 38, 37, 36 g/l. The source of trivalent chromium is selected for solubility in the working bath, which is often a function of the nature and amounts of other components in the bath. Desirably, the amount of trivalent chromium source is sufficient to provide a total concentration of trivalent chromium cation in a working composition according to the invention of at least, with increasing preference in the order given, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 15.5, 16, 16.5, 17, 17.5, 18, 18.5, 19, 19.5, 20, 21, 22, 23, 24, 25 g/l.

Independent of the amount of components (A) and (B) it is desirable that the weight ratio of trivalent chromium cations to metal in the fluorometallate anions, i.e. titanium, zirconium, hafnium, silicon, aluminum, and boron, is within the range of 0.725:1 to 39:1. Preferred ratios are at least, with increasing preference in the order given, 1:1, 2:1, 3:1, 4:1, 5:1, 6:1, 7:1, 8:1, 9:1 and 10:1 and preferably not more than, with increasing preference in the order given, 30:1, 29:1, 27:1, 25:1. Salt spray performance according to ASTM B117 is lower outside of these ranges for compositions according to the invention.

A component of free fluoride ions (C) may optionally be provided, which may or may not be part of any of immediately previously recited components (A) through (B). This component may be supplied to the composition by hydrofluoric acid or any of its partially or completely neutralized salts that are sufficiently water soluble. At least for economy, component (C) is preferably supplied by aqueous hydrofluoric acid, and independently preferably is present in a concentration that is at least, with increasing preference in the order given, 0.10, 0.30, 0.50, 0.60, 0.70, 0.80, or 0.90 ppt of its stoichiometric equivalent as HF. Independently, in a working composition to be used in a process according to the invention, the concentration of component (C), measured as its stoichiometric equivalent as HF, preferably is not more than, with increasing preference in the order given, 10, 8.0, 6.0, 4.0, 3.0, 2.0, 1.5, 1.3, or 1.1 ppt. Suitable sources of free fluoride ions are known to those of skill in the art. Preferably, the source of (C) is HF.

Component (D), if used, is chosen from anionic surfactants, such as salts of carboxylic acids, alkylsulphonates, alkyl-substituted phenylsulphonates; nonionic surfactants, such as alkyl-substituted diphenylacetylenic alcohols and nonylphenol polyoxyethylenes; and cationic surfactants such as alkylammonium salts; all of these may and preferably do contain fluorine atoms bonded directly to carbon atoms in their molecules. Each molecule of a surfactant used preferably contains a hydrophobe portion that (i) is bonded by a continuous chain and/or ring of covalent bonds; (ii) contains a number of carbon atoms that is at least, with increasing preference in the order given, 10, 12, 14, or 16 and independently preferably is not more than, with increasing preference in the order given, 30, 26, 22, or 20; and (iii) contains no other atoms except hydrogen, halogen, and ether-bonded oxygen atoms. Component (D) is most preferably a non-ionic fluorosurfactant, such materials are known in the art and commercially available under the Zonyl® trade name from E.I. du Pont de Nemours and Company.

A working composition according to the invention may contain, with increasing preference in the order given, at least 0.010, 0.030, 0.050, 0.070, 0.080, 0.090, or 0.100 ppt of component (D) and independently preferably, primarily for reasons of economy, contains not more than, with increasing preference in the order given, 5.0, 2.5, 1.30, 0.80, 0.60, 0.40, 0.30, 0.20, 0.18, 0.15, 0.13, or 0.11 ppt of component (D).

Compositions according to the invention are acidic. The pH preferably is at least, with increasing preference in the order given, 2.10, 2.30, 2.50, 2.70, 2.90, 3.0, 3.10, 3.20, 3.30, 3.40, 3.50, 3.60, 3.70, 3.80, 3.90, or 4.0 and independently preferably is not more than, with increasing preference in the order given, 5.0, 4.95, 4.90, 4.80, 4.70, 4.60, 4.50, 4.40, 4.30 or 4.20. A pH adjusting component (E), which may or may not be part of any of the immediately previously recited components (A) through (D) can be added to the composition in an amount sufficient to produce a pH in the above-recited range, as necessary. A pH adjusting component may be any acid or a base, known in the art which does not interfere with the objects of the invention. In one embodiment, the pH adjuster is an acid, desirably HF, which also provides free fluoride ion (C). In another embodiment, the pH adjusting component comprises a base, and desirably is ammonium hydroxide.

A working composition according to the invention may be applied to a metal workpiece, rinsed and dried thereon by any convenient method, several of which will be readily apparent to those skilled in the art. For example, coating the metal with a liquid film may be accomplished by immersing the surface in a container of the liquid composition, spraying the composition on the surface, coating the surface by passing it between upper and lower rollers with the lower roller immersed in a container of the liquid composition, contact with a brush or felt saturated with the liquid treatment composition, and the like, or by a mixture of methods. Excessive amounts of the liquid composition that might otherwise remain on the surface prior to drying may be removed before drying by any convenient method, such as rinsing, drainage under the influence of gravity, passing between rolls, and the like.

The temperature during application of the liquid composition may be any temperature within the liquid range of the composition, although for convenience and economy in application, normal room temperature, i.e., from 20-27° C., is usually preferred.

Application of compositions of the instant invention provide improved adhesive bonding to subsequently applied protective layers, such as paints, lacquers and other resin based coatings.

The total add-on mass (after drying) of the coating applied in a process according to the invention is at least, with increasing preference in the order given, 20, 21, 22, 23, 24, 25, 26, 27, 28, 29, 30 grams per square foot of surface coated (hereinafter usually abbreviated as "mg/ft$^2$"). Independently, at least equal corrosion resistance ordinarily will be achieved even if the add-on mass is not, and therefore for reasons of economy the add-on mass preferably is not greater than, with increasing preference in the order given, 120, 115, 110, 100 mg/ft$^2$.

The add-on mass of the protective film formed by a process according to the invention may be conveniently monitored and controlled by measuring the add-on weight or mass of the metal atoms in the anions of component (A) as defined above, or of chromium, except in the unusual instances when the initial protective coating and/or the underlying metal substrate contains the same metal element(s). The amount of these metal atoms may be measured by any of several conventional analytical techniques known to those skilled in the art. The most reliable measurements generally involve dissolving the coating from a known area of coated substrate and determining the content of the metal of interest in the resulting solution. The total add-on mass can then be calculated from the known relationship between the amount of the metal in component (A) and the total mass of the part of the total composition that remains after drying. However, this method is often impractical for use with this invention, because the area touched up is not always precisely defined. A more practical alternative is generally provided by small area X-ray spectrographs that, after conventional calibration, directly measure the amount(s) per unit area of individual metallic element(s) present in a coating, free from almost all interferences except the same elements present in other coatings on, or in a thin layer near the surface of, the underlying metal surface itself.

The effectiveness of a treatment according to the invention appears to depend predominantly on the total amounts of the active ingredients that are present on each unit area of the treated surface, and on the nature of the active ingredients and their ratios to one another, rather than on the concentration of the acidic aqueous composition used, and the speed of drying has not been observed to have any technical effect on the invention, although it may well be important for economic reasons. If practical in view of the size of the object treated and the size of the areas of the object to be treated, drying may be speeded by placement of the surface to be treated, either before or after application to the surface of a liquid composition in a process according to the invention, in an oven, use of radiative or microwave heating, or the like. Heating the surface before treatment is preferred over heating after treatment when practical, and prewarming temperatures up to at least 65° C. may be satisfactorily used. If ample time is available at acceptable economic cost, a liquid film applied according to this invention often may simply be allowed to dry spontaneously in the ambient atmosphere with equally good results insofar as the protective quality of the coating is concerned. Suitable methods for each circumstance will be readily apparent to those skilled in the art.

Preferably, the surface to be treated according to the invention is first cleaned of any contaminants, particularly organic contaminants and foreign metal fines and/or inclusions. Such cleaning may be accomplished by methods known to those skilled in the art and adapted to the particular type of substrate to be treated. For example, for galvanized steel surfaces, the substrate is most preferably cleaned with a conventional hot alkaline cleaner, then rinsed with hot water and dried. For aluminum, the surface to be treated most preferably is first contacted with a conventional hot alkaline cleaner, then rinsed in hot water, then, optionally, contacted with a neutralizing acid rinse and/or deoxidized, before being contacted with an acid aqueous composition as described above.

After the preparatory cleaning, the surface may be dried by absorption of the cleaning fluid, evaporation, or any suitable method known to those skilled in the art. Corrosion resistance is usually less than optimal when there is a delay between the preparatory cleaning, or cleaning and drying, and the coating of the surface. The time between cleaning, or cleaning and drying, and coating the surface should be no more than, in increasing order of preference, 48, 24, 12, 6.0, 5.0, 4.0, 3.0, 2.0, 1.0, 0.50, 0.25, or 0.1 hours.

The practice of this invention may be further appreciated by consideration of the following, non-limiting, working examples.

EXAMPLES

Comparative Examples

Comparative Examples 1-3 were made according to the prior art using an aqueous solution of sulfate salt of trivalent chromium, commercially available from Mcgean Specialty Chemicals, which the manufacturer indicated was 12 wt % Cr. Comparative Example 2 contains 10 wt % more of the sulfate salt than Comparative Example 1. Comparative Example 3 contains 20 wt % more of the sulfate salt than Comparative Example 1. Commercially available, 2024 T3 bare aluminum panels were cleaned in Ridoline 4355, an alkaline cleaner commercially available from Henkel Corporation, for 10 minutes, rinsed with water, contacted with Deoxylyte 2310, a deoxidizer commercially available from Henkel Corporation, for 5 minutes and rinsed. Three panels were treated for each comparative example, being nine panels in total. The panels were contacted with their respective working baths, at ambient temperatures, for 10 minutes.

TABLE 1

|  | Comparative Example 1 (g/l) | Comparative Example 2 +10% $Cr_2(SO_4)_3$ | Comparative Example 3 +20% $Cr_2(SO_4)_3$ |
| --- | --- | --- | --- |
| DI Water | 986.45 | 986.45 | 986.45 |
| $H_2ZrF_6$ (40% in water) | 5.48 | 5.48 | 5.48 |
| KOH (40% in water) | 3.62 | 3.62 | 3.62 |
| $Cr_2(SO_4)_3$ (12 wt % Cr) | 4.45 | 4.90 | 5.35 |
| Cr (g/l) | 0.53 | 0.59 | 0.64 |
| Cr:Zr mass ratio | 0.56 | 0.61 | 0.66 |
| 336 Hrs SS Results | 3 pits/panel | 15 pits/panel | 15 pits/panel |

The panels were cured for 3 days at ambient temperature and humidity. All panels were exposed to 336 hours salt spray testing according to ASTM B117. Increasing the amount of trivalent chromium sulfate salt, while holding the other component amounts constant resulted in decreased salt spray performance, see Comparative Examples 2 and 3.

Baths made according to the comparative examples of Table 1 were observed after aging for 1-2 weeks. The baths developed a fine sediment that sank to the bottom as sludge. The production of sludge took place in unused baths, as well as baths that were used to treat panels. The sludge produced was disturbed by panel coating operations, which caused the sludge to disperse in the bath. Coating panels while the sludge was dispersed in the bath resulted in an undesirable powdery white deposit on the coated panel surfaces.

Example 1

Trivalent chromium conversion coating compositions were made according to Table 2. The chromium (III) fluoride was added to water at 160° F. and mixed until dissolved completely. The solution was cooled to room temperature and fluorozirconic acid added. The pH of the compositions was adjusted using ammonium hydroxide.

Commercially available, 2024 T3 bare 3 inch by 8 inch aluminum panels were prepared according to the procedure for the Comparative Examples. Each panel was then contacted with one of the compositions of Table 2 for the indicated period of time at ambient temperature.

TABLE 2

| Sample | CrF$_3$—4H$_2$O | H$_2$ZrF$_6$ 45% solution | Water-DI | pH | Immersion Time | Corrosion 336 hr SS |
|---|---|---|---|---|---|---|
| 4.000 | 3.875 | 0.325 | 95.800 | 3.750 | 10.000 | 1.000 |
| 9.000 | 5.000 | 1.000 | 94.000 | 5.000 | 10.000 | 1.000 |
| 19.000 | 0.500 | 0.100 | 99.400 | 2.500 | 10.000 | 1.000 |
| 6.000 | 0.500 | 0.100 | 99.400 | 5.000 | 10.000 | 2.000 |
| 34.000 | 0.500 | 0.100 | 99.400 | 5.000 | 10.000 | 2.000 |
| 32.000 | 2.750 | 0.550 | 96.700 | 5.000 | 10.000 | 3.000 |
| 12.000 | 0.500 | 1.000 | 98.500 | 5.000 | 10.000 | 3.000 |
| 15.000 | 0.500 | 1.000 | 98.500 | 5.000 | 10.000 | 3.000 |
| 17.000 | 2.750 | 0.100 | 97.150 | 5.000 | 10.000 | 4.000 |
| 27.000 | 5.000 | 1.000 | 94.000 | 5.000 | 10.000 | 4.000 |
| 13.000 | 2.750 | 0.100 | 97.150 | 5.000 | 10.000 | 6.000 |
| 2.000 | 5.000 | 0.100 | 94.900 | 5.000 | 10.000 | 8.000 |
| 5.000 | 5.000 | 0.100 | 94.900 | 2.500 | 10.000 | 10.000 |
| 1.000 | 2.750 | 0.100 | 97.150 | 2.500 | 10.000 | 10.000 |
| 8.000 | 5.000 | 1.000 | 94.000 | 2.500 | 10.000 | 10.000 |
| 22.000 | 0.500 | 0.550 | 98.950 | 2.500 | 10.000 | 10.000 |
| 10.000 | 0.500 | 1.000 | 98.500 | 2.500 | 10.000 | 10.000 |
| 29.000 | 1.625 | 0.325 | 98.050 | 3.750 | 6.500 | 4.000 |
| 25.000 | 3.875 | 0.325 | 95.800 | 5.000 | 6.500 | 5.000 |
| 14.000 | 3.875 | 0.775 | 95.350 | 2.500 | 6.500 | 10.000 |
| 18.000 | 0.500 | 1.000 | 98.500 | 5.000 | 3.000 | 2.000 |
| 7.000 | 0.500 | 0.550 | 98.950 | 5.000 | 3.000 | 3.000 |
| 26.000 | 0.500 | 1.000 | 98.500 | 2.500 | 3.000 | 6.000 |
| 31.000 | 3.875 | 0.775 | 95.350 | 3.750 | 3.000 | 7.000 |
| 23.000 | 5.000 | 1.000 | 94.000 | 5.000 | 3.000 | 7.000 |
| 16.000 | 0.500 | 0.100 | 99.400 | 2.500 | 3.000 | 7.000 |
| 11.000 | 0.500 | 0.100 | 99.400 | 5.000 | 3.000 | 7.000 |
| 24.000 | 2.750 | 0.100 | 97.150 | 5.000 | 3.000 | 8.000 |
| 28.000 | 5.000 | 0.100 | 94.900 | 5.000 | 3.000 | 9.000 |
| 3.000 | 5.000 | 0.100 | 94.900 | 2.500 | 3.000 | 10.000 |
| 33.000 | 5.000 | 0.100 | 94.900 | 2.500 | 3.000 | 10.000 |
| 30.000 | 5.000 | 1.000 | 94.000 | 2.500 | 3.000 | 10.000 |
| 20.000 | 2.750 | 1.000 | 96.250 | 2.500 | 3.000 | 10.000 |
| 21.000 | 0.500 | 0.550 | 98.950 | 2.500 | 3.000 | 10.000 |

* Amounts of components are in weight percent.

The panels were cured for 3 days at ambient temperature and humidity. All panels were exposed to 336 hours salt spray testing according to ASTM B117 and were rated on a 1-10 scale. 1=no corrosion; 2=staining, but no corrosion; 3=1-3 pits/panel. A rating of 3 was considered the minimum performance for adequate salt spray resistance.

Table 3 provides a comparison of coatings having adequate salt spray performance at a constant contact time of 10 minutes at ambient temperature.

TABLE 3

| Sample | CrF$_3$—4H$_2$O | Cr III | H$_2$ZrF$_6$ 45% solution | Zr | Cr:Zr wt ratio | Water-DI | pH | Immersion Time | Corrosion 336 hr SS |
|---|---|---|---|---|---|---|---|---|---|
| 4 | 3.875 | 1.113 | 0.325 | 0.064 | 17.4 | 95.800 | 3.75 | 10.00 | 1 |
| 9 | 5.000 | 1.440 | 1.000 | 0.198 | 7.3 | 94.000 | 5.00 | 10.00 | 1 |
| 19 | 0.500 | 0.144 | 0.100 | 0.020 | 7.2 | 99.400 | 2.50 | 10.00 | 1 |
| 6 | 0.500 | 0.144 | 0.100 | 0.020 | 7.2 | 99.400 | 5.00 | 10.00 | 2 |
| 34 | 0.500 | 0.144 | 0.100 | 0.020 | 7.2 | 99.400 | 5.00 | 10.00 | 2 |
| 32 | 2.750 | 0.790 | 0.550 | 0.110 | 7.2 | 96.700 | 5.00 | 10.00 | 3 |
| 12 | 0.500 | 0.144 | 1.000 | 0.198 | 0.72 | 98.500 | 5.00 | 10.00 | 3 |
| 15 | 0.500 | 0.144 | 1.000 | 0.198 | 0.72 | 98.500 | 5.00 | 10.00 | 3 |

* Amounts of components are in weight percent.

Example 2

A trivalent chromium conversion coating composition was made according to Table 4. The chromium (III) fluoride was added to water at 160° F. and mixed until dissolved completely. The solution was cooled to room temperature and fluorozirconic acid added.

TABLE 4

| Component (g) | Formula A | Concentrate (g/l) | Working Bath (g/l) |
|---|---|---|---|
| CrF$_3$—4H$_2$O | 124.00 | 31.0 | 23.3 Cr III = 6.7 g/l |
| Fluorozirconic acid, 45% | 17.76 | 4.45 | 3.3 Zr = 0.65 g/l |
| Distilled water | 3854.08 | | Cr:Zr |
| | | | 10.25:1 |
| Total | 3995.84 | 1000.0 | 1000.0 |

The pH of the Formula A solution was adjusted to 4.0 by addition of ammonium hydroxide. Three, commercially available, 2024 T3 bare aluminum panels were prepared according to the procedure for the Comparative Examples. Formula A was diluted to a 75% working bath of the coating composition with distilled water. Each panel was then contacted with the working bath for 3 minutes at ambient temperature. The panels were cured for 3 days at ambient temperature and humidity. Coating weight was measured as 29.6 mg/ft$^2$ All panels were exposed to 336 hours salt spray testing according to ASTM B117. Panels coated in a working bath of Formula A had no pits after 336 hours salt spray testing.

A bath made according to Example 2 was observed after aging for 1-2 weeks; no sludge was observed in baths that were unused. Baths used to process panels to ambient temperature likewise showed no sludging. Panels coated in aged baths appeared substantially the same as those coated in fresh baths according to the invention.

This invention provides a trivalent chromium-containing conversion coating composition that can be used in conversion coating a variety of metals including aluminum and aluminum alloy. It can be used in many variations of the processes that are employed in conversion coating of metal substrates. While the invention has been described in terms of specific embodiments thereof, it will be appreciated that other forms could readily be adapted by one skilled in the art. Accordingly, the scope of the invention is to be considered limited only by the following claims.

The invention claimed is:

1. A storage stable composition made by mixing together a first mass of water and at least the following components:
   (A) a second mass of a water-soluble source of fluorometallate anions to provide in the composition from about 1 to about 100 g/kg of the fluorometallate anion, each of said anions consisting of:

(i) at least four fluorine atoms; and
(ii) at least one atom of an element selected from the group consisting of titanium, zirconium, hafnium, silicon, aluminum, and boron, and, optionally, one or both of
(iii) at least one ionizable hydrogen atom; and
(iv) at least one oxygen atom;
(B) a third mass in an amount of about 23 g/l to about 100 g/l of a water soluble source of chromium fluoride;
(C) an optional fourth mass of water-soluble source of fluorine anions;
(D) an optional fifth mass of a component of surfactant and/or water soluble thickener;
said composition being free of water-soluble organic corrosion inhibitor and water-soluble organic stabilizing agents, having a pH of at least 2.1 and no more than 4.4, being storage stable at ambient temperature for at least 2 weeks and capable of producing no more than 3 pits per panel after being exposed to 336 hour salt spray testing according to ASTM B-117.

2. The composition according to claim 1, wherein said liquid composition comprises not more than 0.06% of dispersed silica and silicates.

3. The composition according to claim 1, wherein:
the second mass comprises fluorozirconate anions in an amount that corresponds to a concentration, in said composition, that is within a range from about 1 to about 8 g/kg; and
there is mixed into said composition a fifth mass of fluorinated alkyl ester surfactant molecules that corresponds to a concentration, in said composition, that is within a range from about 0.070 to about 0.13 ppt.

4. The composition according to claim 1, wherein the third mass is present in an amount of 33 g/l to about 100 g/l of a water soluble solution of trivalent chromium cations.

5. The composition according to claim 1, wherein the third mass is present in an amount of 50 g/l to about 100 g/l of a water soluble solution of trivalent chromium cations.

6. The composition according to claim 1, wherein each fluorometallate anion consists of:
(i) at least four fluorine atoms;
(ii) at least one atom of an element selected from the group consisting of titanium, zirconium, hafnium, silicon, aluminum, and boron, and, one or both of
(iii) at least one ionizable hydrogen atom; and
(iv) at least one oxygen atom.

7. The composition according to claim 1, wherein the fourth mass is mixed together with the first, second and third masses to form the composition.

8. The composition according to claim 7, wherein the weight ratio of trivalent chromium to metal in the fluorometallate anions is 0.725:1 to 39:1.

9. The composition according to claim 1, wherein the weight ratio of trivalent chromium to metal in the fluorometallate anions is 0.725:1 to 39:1.

10. The composition according to claim 1, wherein the fluorometallate anions are selected from the group consisting of fluorosilicate, fluorotitanate, and fluorozirconate anions.

11. The composition according to claim 1, wherein the fluorometallate anions include fluorozirconate anions in a concentration within a range from about 0.4 to 100 g/kg; and said liquid composition comprising not more than 0.06% of dispersed silica and silicates.

12. The composition according to claim 1, wherein an acid or base pH adjuster is present to maintain the pH within the range of at least 2.1 and no more than 4.4.

13. The composition according to claim 1, wherein the pH is at least 3.0 and no more than 4.2.

14. A composition for coating a metal surface, said composition consisting of water and:
(A) a component of fluorometallate anions, each of said anions consisting of:
(i) at least four fluorine atoms; and
(ii) at least one atom of an element selected from the group consisting of titanium, zirconium, hafnium, silicon, aluminum, and boron, and, optionally, one or both of
(iii) at least one ionizable hydrogen atom; and
(iv) at least one oxygen atom;
(B) a component of water soluble chromium fluoride;
(C) an optional component of water-soluble source of fluorine anions;
(D) an optional component of surfactant;
(E) and optional component of water soluble thickener;
wherein the concentration of trivalent chromium is at least 6.0 g/l and said composition is substantially free of hexavalent chromium and has a pH of no more than 4.4 and is storage stable at ambient temperature for at least 2 weeks.

15. The composition according to claim 14, wherein the fluorometallate anions are selected from the group consisting of fluorosilicate, fluorotitanate, and fluorozirconate anions.

16. The composition according to claim 15, wherein the fluorometallate anions include fluorozirconate anions in a concentration within a range from about 0.4 to 100 g/kg; water soluble chromium fluoride in a concentration within a range from about 4 to 100 g/l and said liquid composition comprising not more than 0.06% of dispersed silica and silicates.

17. The composition according to claim 16, wherein trivalent chromium and zirconium are present in a ratio of trivalent chromium to zirconium in a range of 0.725:1 to 39:1.

18. The composition according to claim 14, wherein:
the fluorometallate anions include fluorozirconate anions;
the concentration of fluorozirconate anions is within a range from about 1 to about 10 g/kg;
the concentration of chromium fluoride is within a range from about 4 g/l to about 100 g/l; and
the ratio of trivalent chromium to zirconium is in the range of 7 to 17.

19. The composition according to claim 14, wherein each fluorometallate anion consist of:
(i) at least four fluorine atoms;
(ii) at least one atom of an element selected from the group consisting of titanium, zirconium, hafnium, silicon, aluminum, and boron, and, one or both of
(iii) at least one ionizable hydrogen atom; and
(iv) at least one oxygen atom.

20. The composition according to claim 14, wherein the pH is at least 3.6 and no more than 4.0, and wherein total add-on mass of the coating is not greater than 120 mg/ft$^2$.

21. A composition for coating a metal surface, said composition comprising water and:
(A) a component of hexafluorozirconate anions present within a range from about 1 g/kg to about 4.5 g/kg;
(B) a component of water soluble chromium fluoride present in an amount of about 5.0 g/l to about 50.0 g/l; and
(C) fluorinated alkyl ester surfactant;
wherein a ratio of trivalent chromium to zirconium is in a range of 12:22, the composition being substantially free of hexavalent chromium and having a pH of at least 2.1 and no more than 4.4.

22. The composition according to claim 21, wherein said composition dried in place on an aluminum substrate provides corrosion resistance such that less than about 3 pits per 24 square inches develop when said substrate is subjected to 5% neutral salt spray at 95° F. ASTM B-117 for at least 336 hours.

23. The composition according to claim 21, further comprising ammonium hydroxide.

24. The composition according to claim 21, wherein the pH is at least 3.6 and no more than 4.0, and wherein total add-on mass of the coating is not greater than 120 mg/ft$^2$.

* * * * *